US012212097B2

(12) United States Patent
Bragg

(10) Patent No.: US 12,212,097 B2
(45) Date of Patent: Jan. 28, 2025

(54) TORSION LATCH

(71) Applicant: Leviton Manufacturing Co., Inc., Melville, NY (US)

(72) Inventor: Charles R Bragg, Bothell, WA (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 400 days.

(21) Appl. No.: 17/707,167

(22) Filed: Mar. 29, 2022

(65) Prior Publication Data

US 2023/0318240 A1 Oct. 5, 2023

(51) Int. Cl.
*H01R 13/62* (2006.01)
*H01R 13/627* (2006.01)

(52) U.S. Cl.
CPC ................................ *H01R 13/6278* (2013.01)

(58) Field of Classification Search
None
See application file for complete search history.

(56) References Cited

U.S. PATENT DOCUMENTS

2021/0288437 A1* 9/2021 Gilbert ................. H01R 13/631

* cited by examiner

*Primary Examiner* — Ross N Gushi
(74) *Attorney, Agent, or Firm* — Amin, Turocy & Watson, LLP

(57) ABSTRACT

A cable connector is equipped with a torsion latching mechanism that offers a more positive retention within a jack and is less susceptible to accidental disengagement relative to cantilevered latches. The latching mechanism requires less displacement force to facilitate disengagement of the connector from the jack while maintaining a disengagement action that is familiar to users. The latching mechanism translates a downward pressure applied by the user to a torsion or twisting action that displaces the connector's latch and disengages the connector from the jack.

20 Claims, 14 Drawing Sheets

TORSION LATCH

TECHNICAL FIELD

The disclosed subject matter relates generally to copper or fiber cable connectors.

BACKGROUND

Connectors for copper data cables, such as registered jack (RJ) type connectors, are typically outfitted with a cantilevered latch for engaging the connector with a data jack. In some connection scenarios, the relatively small point of engagement between the cantilevered latch and the corresponding engagement point of the jack can prove insufficient for retaining the connector in the jack. Moreover, because of its angled protruding structure, the cantilevered latch acts as a potential snag point while the cable is being pulled through a congested space, such as a conduit or channel containing other cables or wires.

The above-described deficiencies of connector systems are merely intended to provide an overview of some of the problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Various embodiments described herein relate to a cable connector that uses a torsion latch, rather than a cantilevered latch, to engage with a jack. The torsion latch is a uniform component with a flat flexible spring that applies a torsion or rotational force to a latching protrusion when an opposing force is applied either by a mechanical feature within the jack (as the connector is being plugged into the jack) or by a user applying a downward force to a release lever. The spring-loaded torsion force holds the latching protrusion in a position of engagement with a mechanical feature within the jack. To release the connector, the user applies a downward force to a release lever on the torsion latch, which is translated to a torsion force that opposes that applied by the spring, displacing the latching protrusion and allowing the connector to be removed from the jack. The torsion latch design offers a more positive engagement between the connector and the jack while maintaining a disconnect action that is familiar to the user. The profile of the torsion latch connector is also less susceptible to snagging as the connector and its corresponding cable are being pulled through high-density installation spaces.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

DETAILED DESCRIPTION

Figure 1:
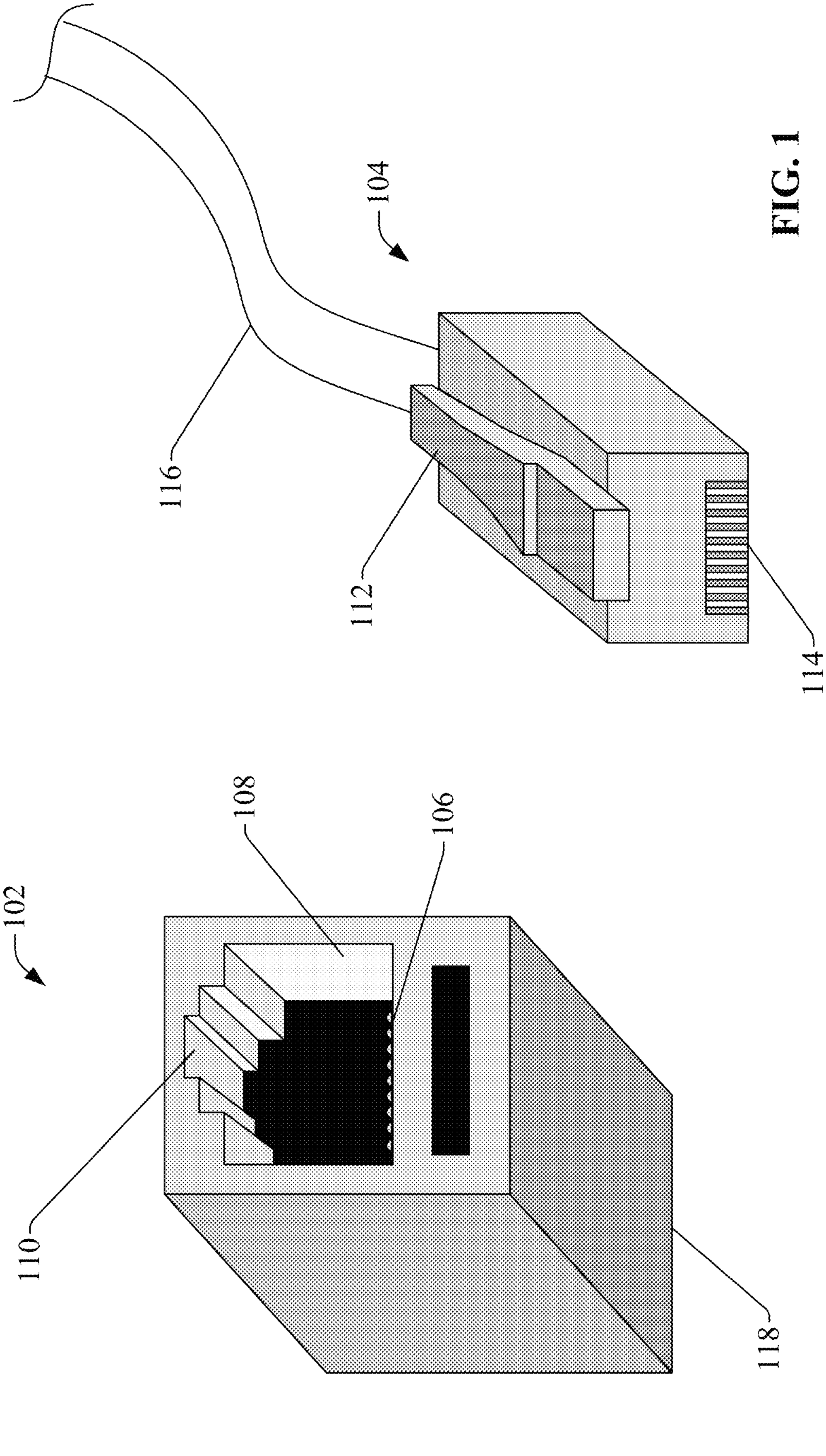
FIG. 1 is a three-dimensional view of an example RJ jack and corresponding connector.

The subject disclosure is now described with reference to the drawings wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

FIG. 1 is a three-dimensional view of an example RJ jack 102 and corresponding connector 104. Jack 102 comprises a receptacle 108 designed to receive the RJ connector 104 (e.g., an RJ45 connector). The receptacle 108 has a profile that corresponds to that of the connector 104 so that the connector 104 can be received into the jack 102.

A spring-loaded cantilevered latch 112 is formed on an outside surface of the connector 104. This latch 112 is configured to slide into a groove 110 formed on the top edge of the jack receptacle 108 when the connector 104 is inserted into the jack 102. When the connector 104 is fully inserted into the jack 102, the cantilevered latch 112 engages with a corresponding engagement feature inside the jack 102, thereby latching the connector 104 inside the jack 102. The connector 104 can be removed from the jack 102 by applying downward pressure to the latch 112, thereby disengaging the latch 112 from the jack 102 and allowing the connector 104 to be removed.

An array of conductive signal contacts 106 or tines installed inside the jack 102 are configured to maintain electrical contact with corresponding signal contacts 114 on the connector 104. Connector 104 can be terminated to the end of a cable 116 (e.g., a twisted pair category cable), and individual conductors of the cable 116 can be separated out and electrically connected to the signal contacts 114 inside connector 104. In this way, when the connector 104 is inserted into jack 102, the contacts 106 inside the jack 102 are electrically connected to corresponding conductors of cable 116.

There are potential drawbacks with the cantilevered latch 112 often used on connectors such as those depicted in FIG. 1. For one, the overlap between the latch 112 and its corresponding engagement feature within the jack 102 is relatively small, and as such the engagement between the connector 104 and the jack 102 may be overcome if sufficient tensile or side load is applied to the cable 116. Moreover, because the angle of the latch's incline faces the direction in which the cable 116 will be pulled during removal, the latch 112 acts as a potential snag point that can easily catch on other cables or structural elements while the cable 116 is being pulled through a congested space.

To address these and other issues, one or more embodiments described herein provide a connector having a torsion latch that offers a more positive retention within the jack and is less susceptible to accidental disengagement due to excessive tensile or side load on the cable 116. The latching mechanism also requires less displacement force to disengage the connector from the jack while maintaining a disengagement action that is familiar to users (namely, a downward force applied to the latch's release lever). In contrast to the cantilevered latch 112 depicted in FIG. 1, the torsion latch described herein translates a downward pressure applied by the user to a torsion or twisting action that displaces the connector's latch and disengages the connector from the jack.

Figure 2:
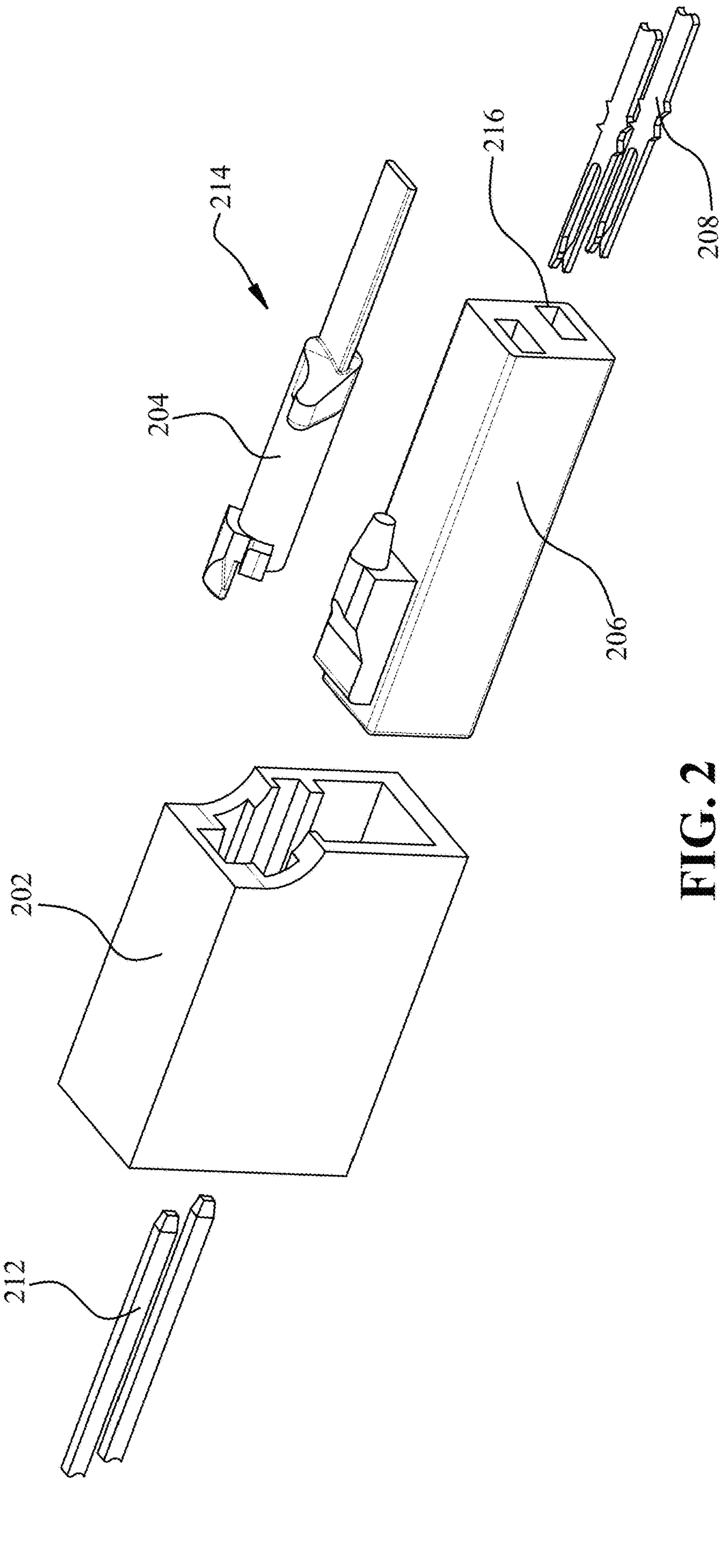
FIG. 2 is an exploded view of a connector system comprising a connector outfitted with a torsion latch and a jack configured to receive the connector.

FIG. 2 is an exploded view of a connector system comprising a connector 214 outfitted with a torsion latch 204 and a jack 202 configured to receive the connector 214. The example connector 214 illustrated herein is designed as a single-pair connector capable of holding a single pair of electrical contacts 208 or tines that make electrical contact with a corresponding pair of contacts 212 housed in the jack 202 while the connector 214 is plugged into the jack 202. However, the torsion latch design described herein can also be used on connectors for other cabling standards, including multi-pair cables. Moreover, although the torsion latch connector 214 is described herein as being a copper cable connector, the torsion latch design can also be used on fiber connectors.

Figure 3A:
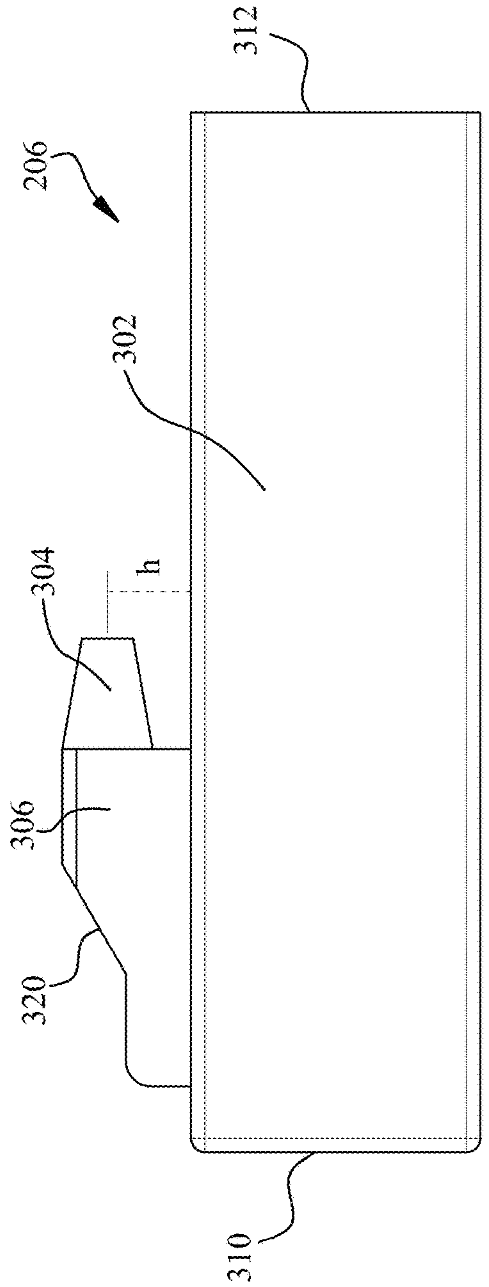
FIG. 3*a* is a side view of a main connector body configured to hold a torsion latch.
Figure 3B:
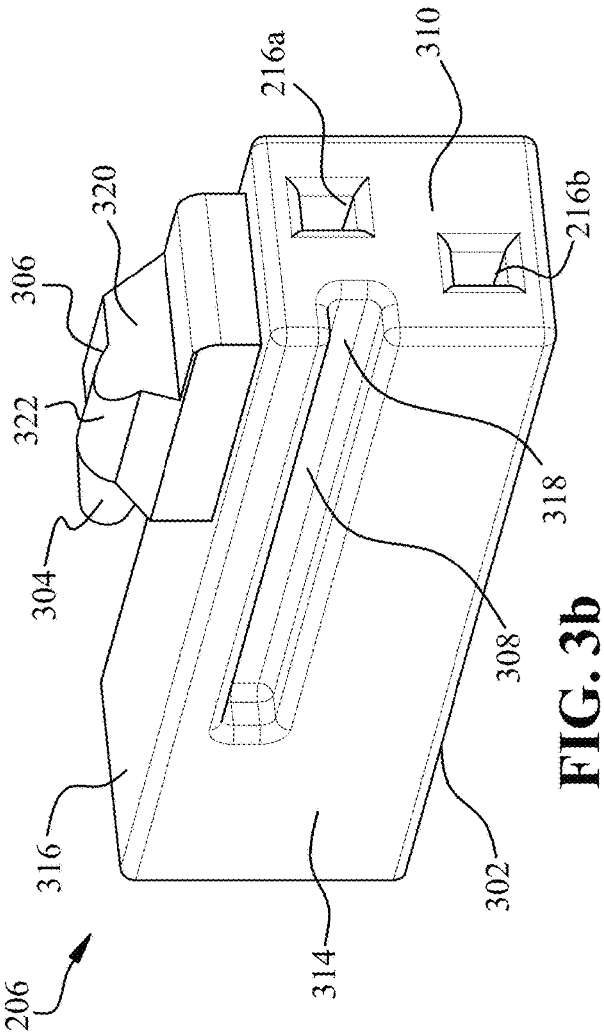
FIG. 3*b* is a perspective view of the main connector body configured to hold a torsion latch.

The torsion latch connector 214 comprises a main connector body 206 on which a torsion latch 204 is mounted. FIGS. 3*a* and 3*b* are a side view and a perspective view, respectively, of the main connector body 206. Main connector body 206 comprises a connector housing 302 on which is formed a latch retaining block 306. In the illustrated example, the connector housing 302 has a substantially square or rectangular cross-sectional profile and comprises a flat front face 310 and a flat rear face 312. Two channels 216*a* and 216*b* are formed through the connector housing 302, traversing the length of the housing 302 from the rear face 312 to the front face 310. These channels 216*a*, 216*b* are configured to hold the electrical contacts 208 to which conductors of a cable will be attached (e.g., by soldering or crimping the conductors to the contacts 208).

The connector housing 302 comprises top, bottom, left side, and right side walls extending between the front face 310 and rear face 312. A groove 308 is formed on the exterior surface of one of the side walls 314, extending from the front face 310 to a point part way between the front face 310 and the rear face 312. The front of this groove 308 forms a notch 318 on a side edge of the front face 310. This notch 318 serves as an entryway for a corresponding rail formed on an inside wall of a jack receptacle, as discussed below.

The latch retaining block 306 is formed on the top side 316 of the connector housing 302 and is positioned near the front face 310 of the housing 302. A cone-shaped axle 304 is formed on a rear-facing side of the latch retaining block 306. The cone-shaped axle 304 is maintained at a height h above the top side 316 of the connector housing 302 and is directed toward the rear side of the connector housing 302. A front-facing surface 320 of the latch retaining block 306 is ramped to assist in guiding the connector 214 into a jack receptacle. A rounded section 322 is formed on top of the latch retaining block 306 and extends in a front-to-rear direction.

Figure 4A:
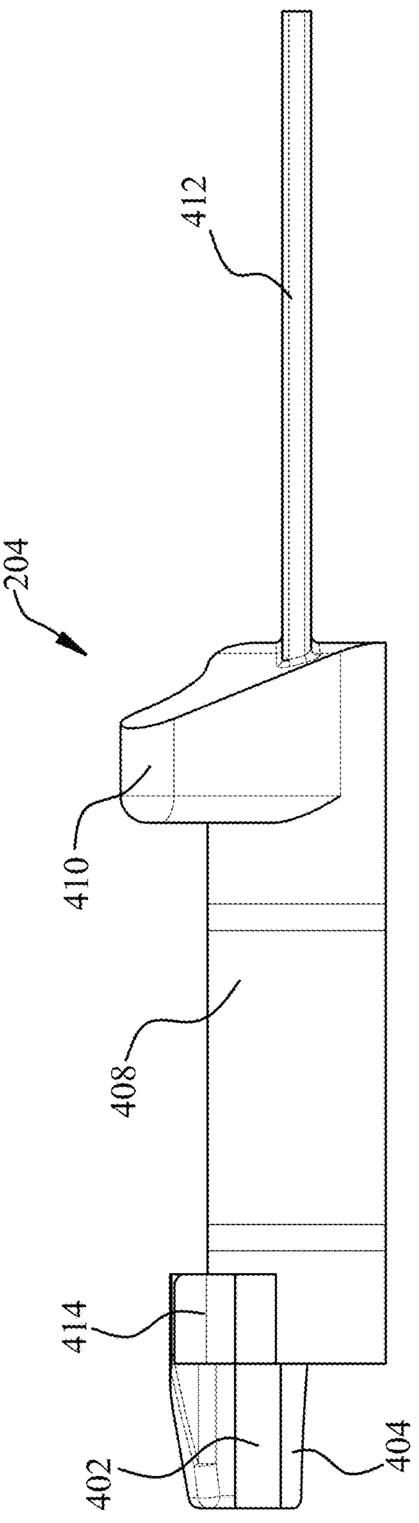
FIG. 4*a* is a side view of a torsion latch.
Figure 4B:
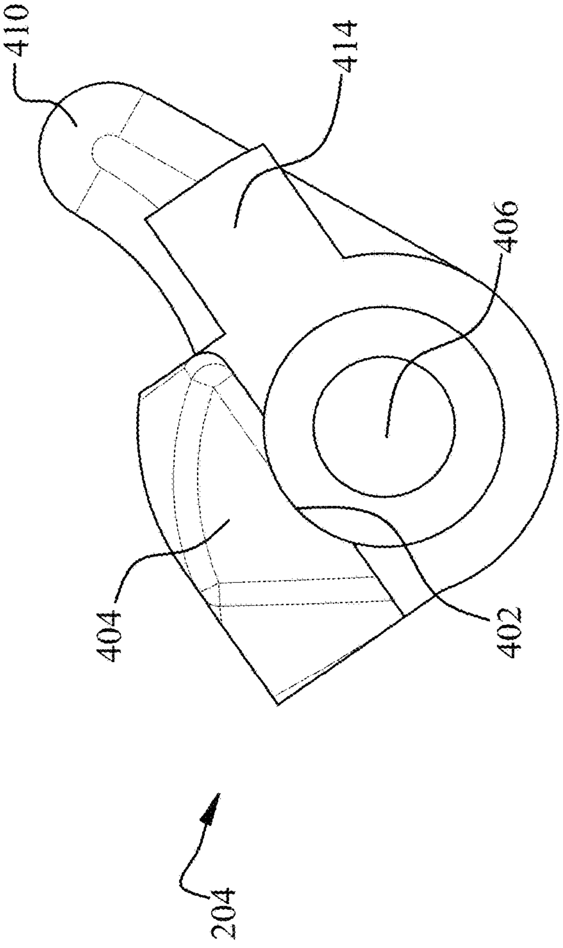
FIG. 4*b* is a front view of the torsion latch.
Figure 4C:
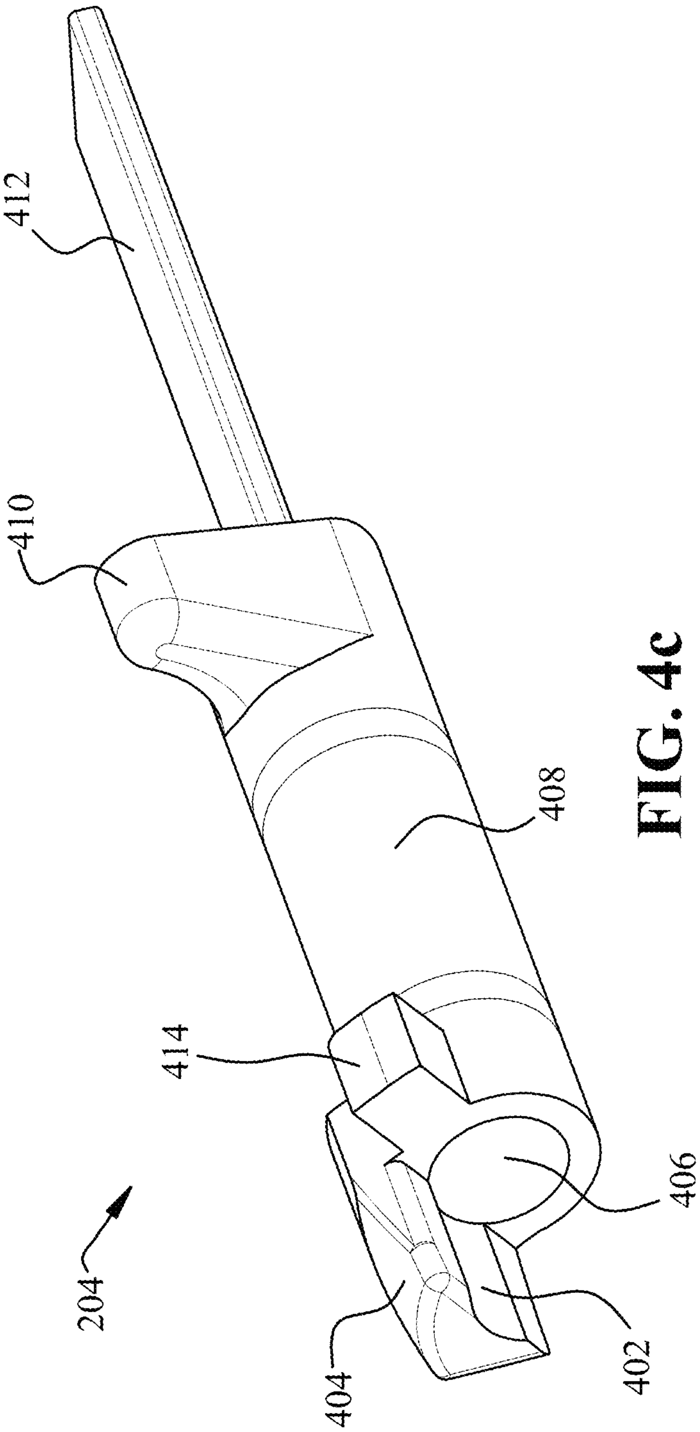
FIG. 4*c* is a perspective view of the torsion latch.

FIGS. 4*a*, 4*b*, and 4*c* are a side view, front view, and perspective view, respectively, of the torsion latch 204. Torsion latch 204 comprises a hollow (or partially hollow) cylindrical body 408 on which a release lever 410 is formed. The release lever 410 protrudes outwardly or laterally from the cylindrical body 408 (substantially orthogonal to the axis of the cylindrical body 408). A flat elongated elastic spring 412 extends from the rear of the cylindrical body 408 substantially parallel with the axis of the cylindrical body 408. A chamfered hole 406 is formed through the front of the cylindrical body 408 and is configured to receive the cone-shaped axle 304 of the latch retaining block 306 on the connector body 206.

A hood 404 extends longitudinally (substantially parallel with the axis of the cylindrical body 408) from the front of the cylindrical body 408 adjacent to the chamfered hole 406. A channel 402 is formed on an inner surface of the hood 404; that is, the surface of the hood 404 that is adjacent to the chamfered hole 406. This channel 402 has a contour that substantially matches the arc of the chamfered hole 406, such that the profile of the channel 402 is continuous with the arc of the hole 406. The profile of the channel 402 also matches the arc of the rounded section 322 on the top side of the latch retaining block 306 (see FIG. 3*b*). The rounded section 322 will reside in the channel 402 when the torsion latch 204 is installed on the connector body 206.

A latching protrusion 414 is also formed on the front of the cylindrical body 408, extending laterally from the cylindrical body 408 (substantially orthogonal to the axis of the cylindrical body 408). The latching protrusion 414 extends from a segment of the cylindrical body's profile that is not covered by the hood 404. The torsion latch 204 can comprise a single molded part made of a material (e.g., plastic) that permits flexibility and elasticity of the spring 412.

Figure 5A:
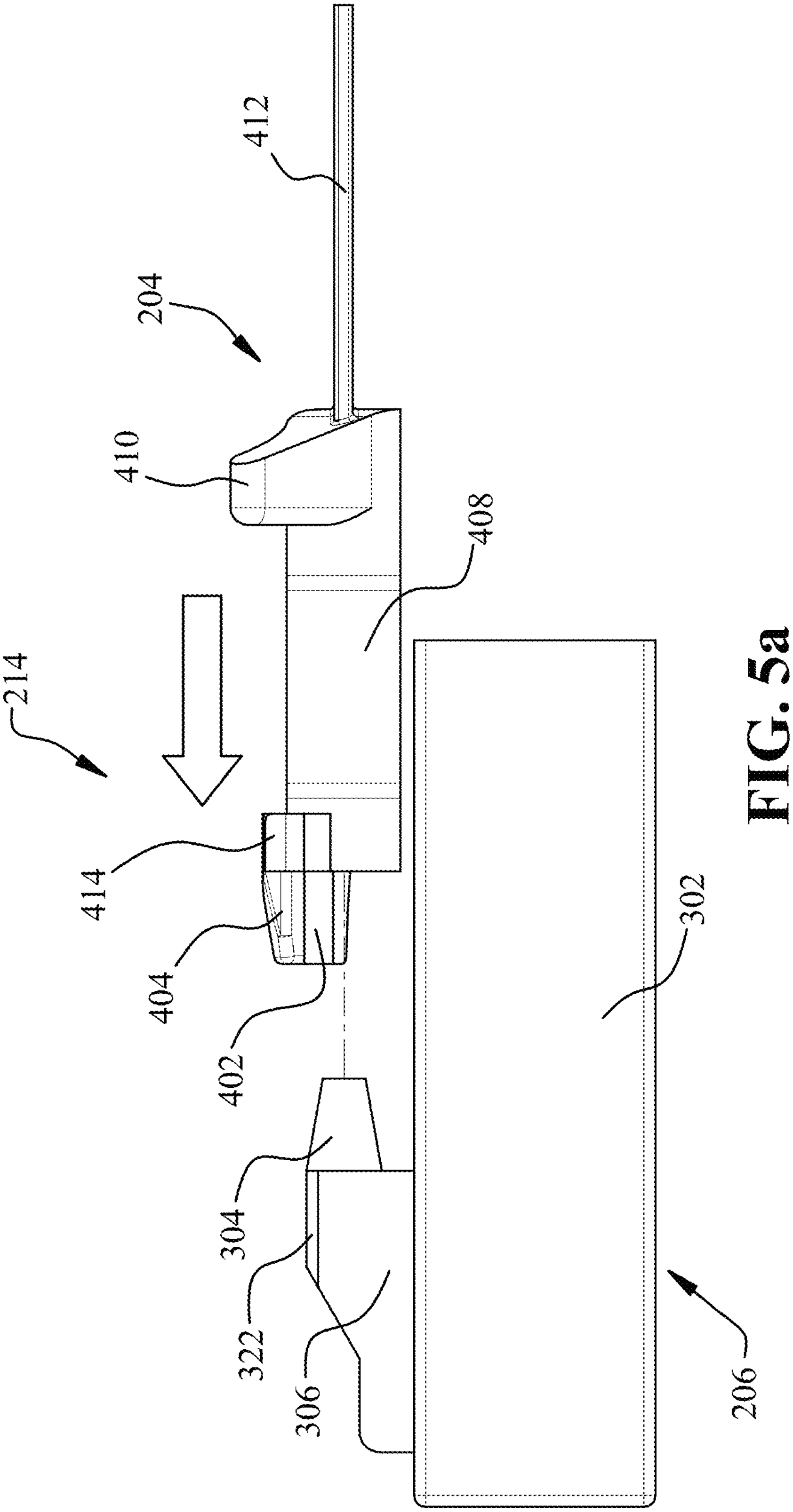
FIG. 5*a* is a side view of a main connector body and a torsion latch aligned for assembly.
Figure 5B:
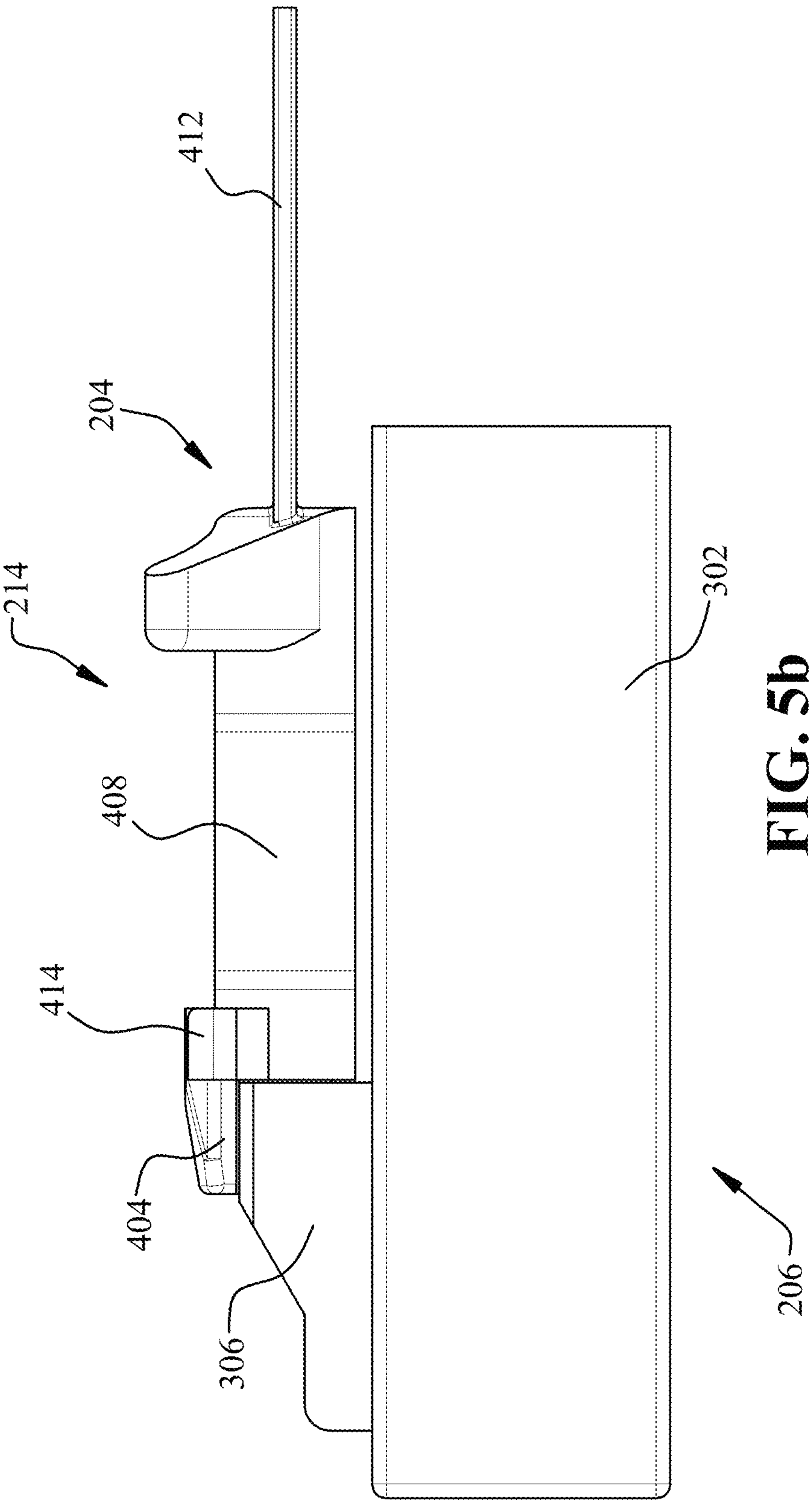
FIG. 5*b* is a side view of the assembled connector comprising the main connector body and the torsion latch.

FIG. 5*a* is a side view of the main connector body 206 and the torsion latch 204 aligned for assembly. To assemble the connector 214, the torsion latch 204 is oriented relative to the main connector body 206 such that the axis of the latch's cylindrical body 408 is aligned with the axis of the cone-shaped axle 304 on the latch retaining block 306. The torsion latch 204 can then be installed on the cone-shaped axle 304 such that the axle 304 resides in, and engages with, the chamfered hole 406 of the torsion latch 204. FIG. 5*b* is a side view of the assembled connector 214. While engaged, the torsion latch 204 is held in place on the latch retaining block 306 while being permitted to rotate about the axis of the cone-shaped axle 304. The height h of the cone-shaped axle above the main connector body 206 (see FIG. 3*a*) ensures sufficient clearance between the latch's cylindrical body 408 and the main connector body 206 to allow the torsion latch 204 to rotate. In some embodiments, a ridge can be formed around the base of the cone-shaped axle 304, and this ridge can be configured to engage with a circular groove formed inside the chamfered hole 406 of the torsion latch 204, thereby holding the torsion latch 204 on the cone-shaped axle 304 while permitting the torsion latch 204 to rotate about the axle 304. These engagement features can also be reversed in some embodiments, such that a groove is formed about the base of the cone-shaped axle 304 and is configured to engage with a circular ridge formed inside the chamfered hole 406. Other mechanisms for engaging the torsion latch 204 with the cone-shaped axle 304 in a manner that permits rotation of the torsion latch 204 about the axle 304 are also within the scope of one or more embodiments.

Figure 6A:
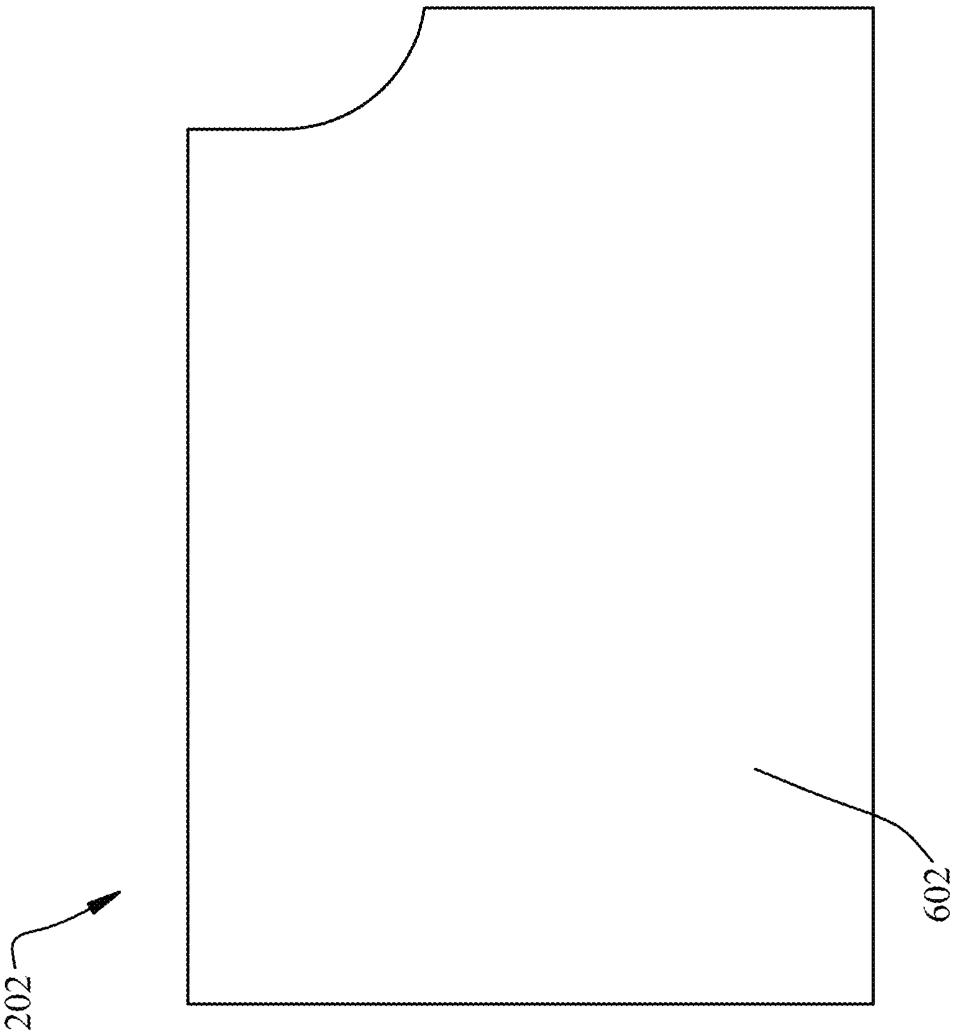
FIG. 6*a* is a side view of a jack configured to receive a torsion latch connector.
Figure 6B:
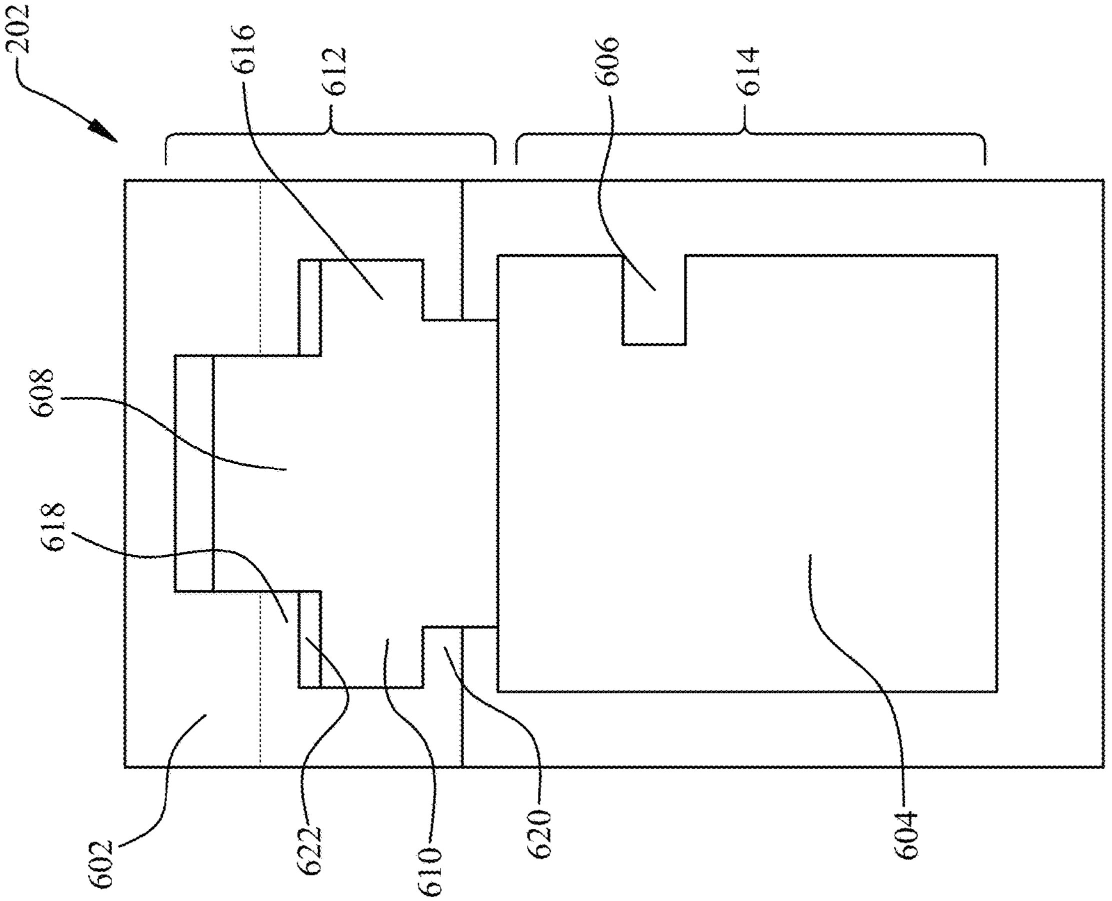
FIG. 6*b* is a front view of the jack configured to receive a torsion latch connector

FIGS. 6*a* and 6*b* are side and front views, respectively, of a jack 202 configured to receive the torsion latch connector 214. Jack 202 comprises a jack housing 602 with a receptacle 604 having a profile designed to receive the torsion latch connector 214. The receptacle 604 comprises a lower portion 614 configured to receive the connector housing 302 of the main connector body 206 and an upper portion 612 configured to receive the latch retaining block 306 and torsion latch 204. The lower portion 614 has a substantially square or rectangular profile similar to the profile of the connector housing 302. A ridge 606 is formed on an interior side wall of the lower portion 614 of the receptacle 604 and is configured to be received in the groove 308 formed on the exterior side wall 314 of the connector housing 302 when the torsion latch connector 214 is inserted into the jack 202 (entering the groove 308 via the notch 318 on the front face 310 of the main connector body 206).

Figure 6C:
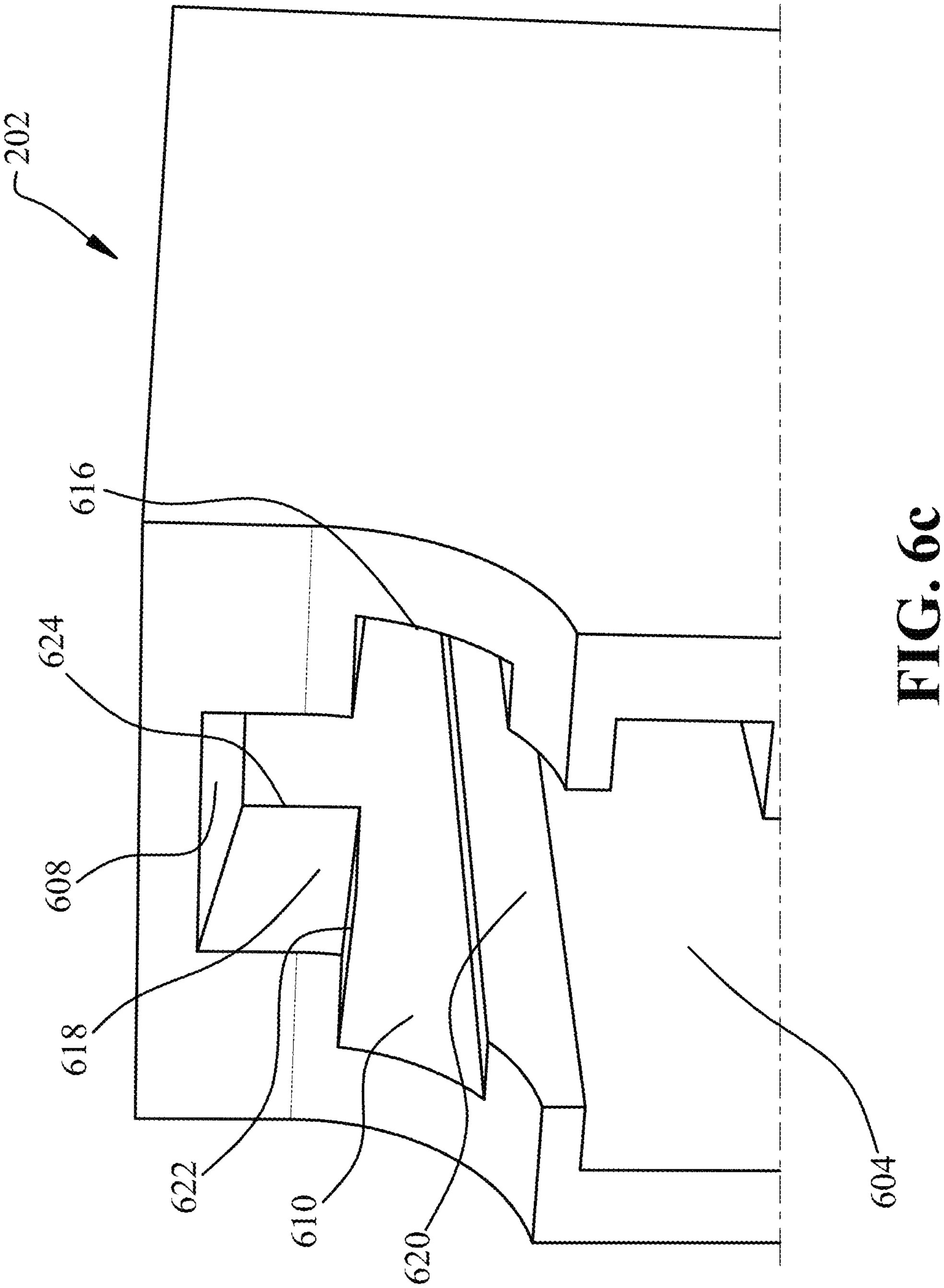
FIG. 6*c* is a perspective view of a jack showing left-side interior rails that define a left channel and a top channel of the jack receptacle.

The upper portion 612 of the receptacle 604 has a cross-shaped profile, including a left channel 610, a right channel 616, and a top channel 608. FIG. 6*c* is a perspective view of the jack 202 showing the left-side interior rails 618 and 620. The left channel 610 is defined by a lower left-side rail 620 (which also defines the lower portion 614 of the receptacle 604) and an upper left-side rail 618. The upper left-side rail 618 extends from the front face of the jack 202 to a point part way into the receptacle 604, terminating in a rear side 624 that will serve as an engagement point for the latching protrusion 414 of the torsion latch connector 214. The upper left-side rail 618 has a downwardly ramped bottom surface 622. As will be described in more detail below, the ramped bottom surface 622 of the upper left-side rail 618 interacts with the latching protrusion 414 to apply a downward force on the protrusion 414 as the torsion latch connector 214 is being inserted into the jack 202.

Figure 7A:
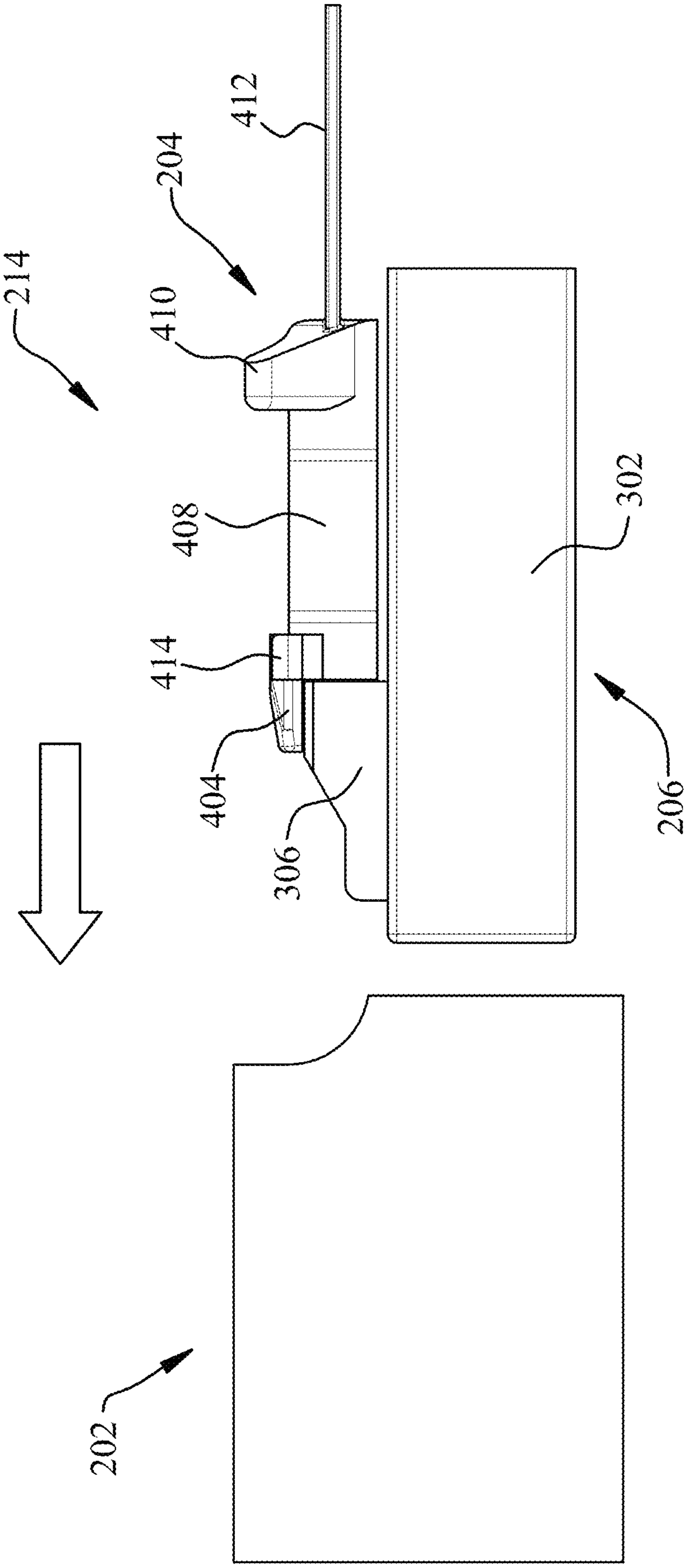
FIG. 7*a* is a side view of a torsion latch connector aligned for engagement with a jack.
Figure 7B:
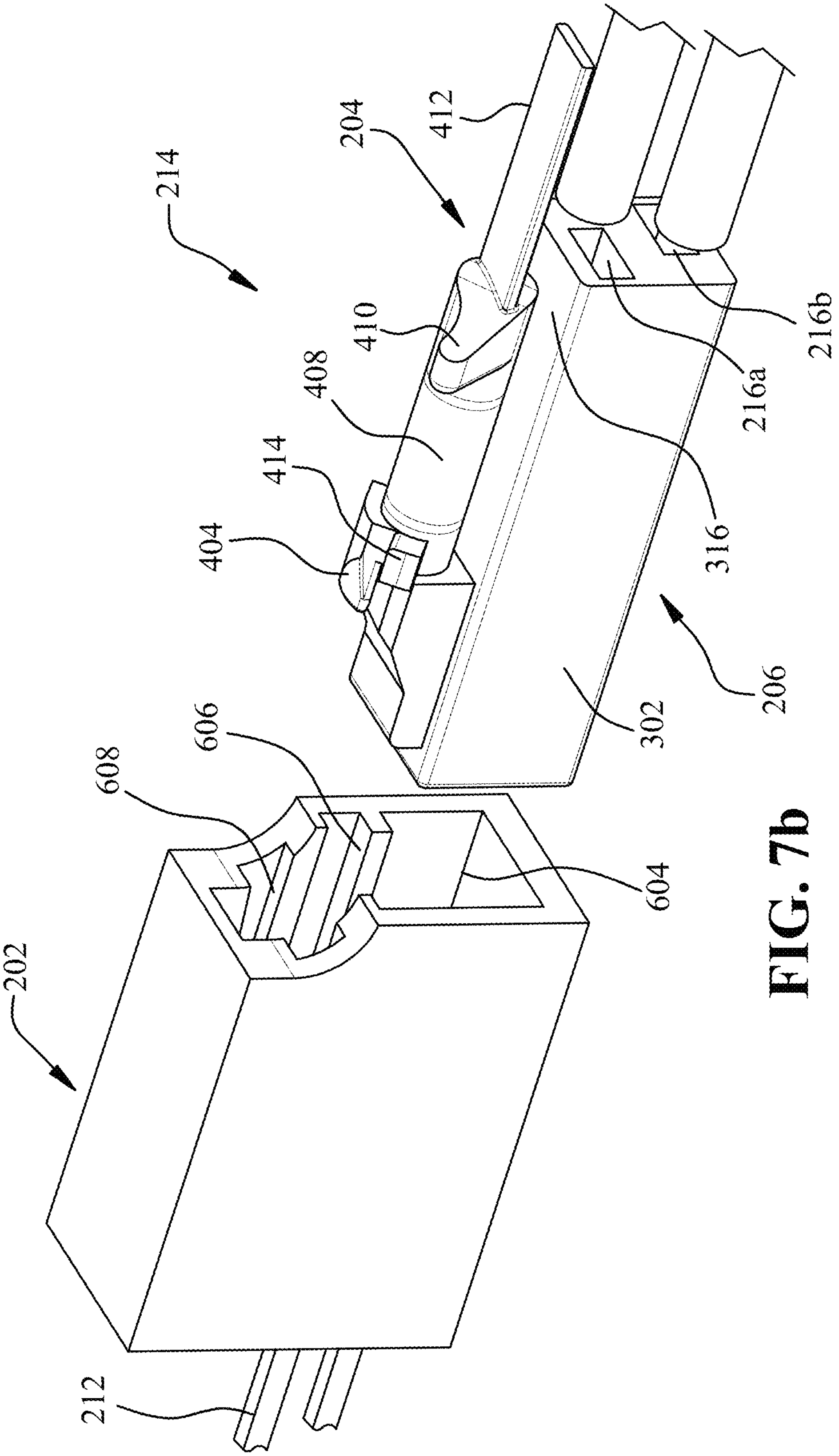
FIG. 7*b* is a perspective view of the torsion latch connector aligned for engagement with the jack.
Figure 8A:
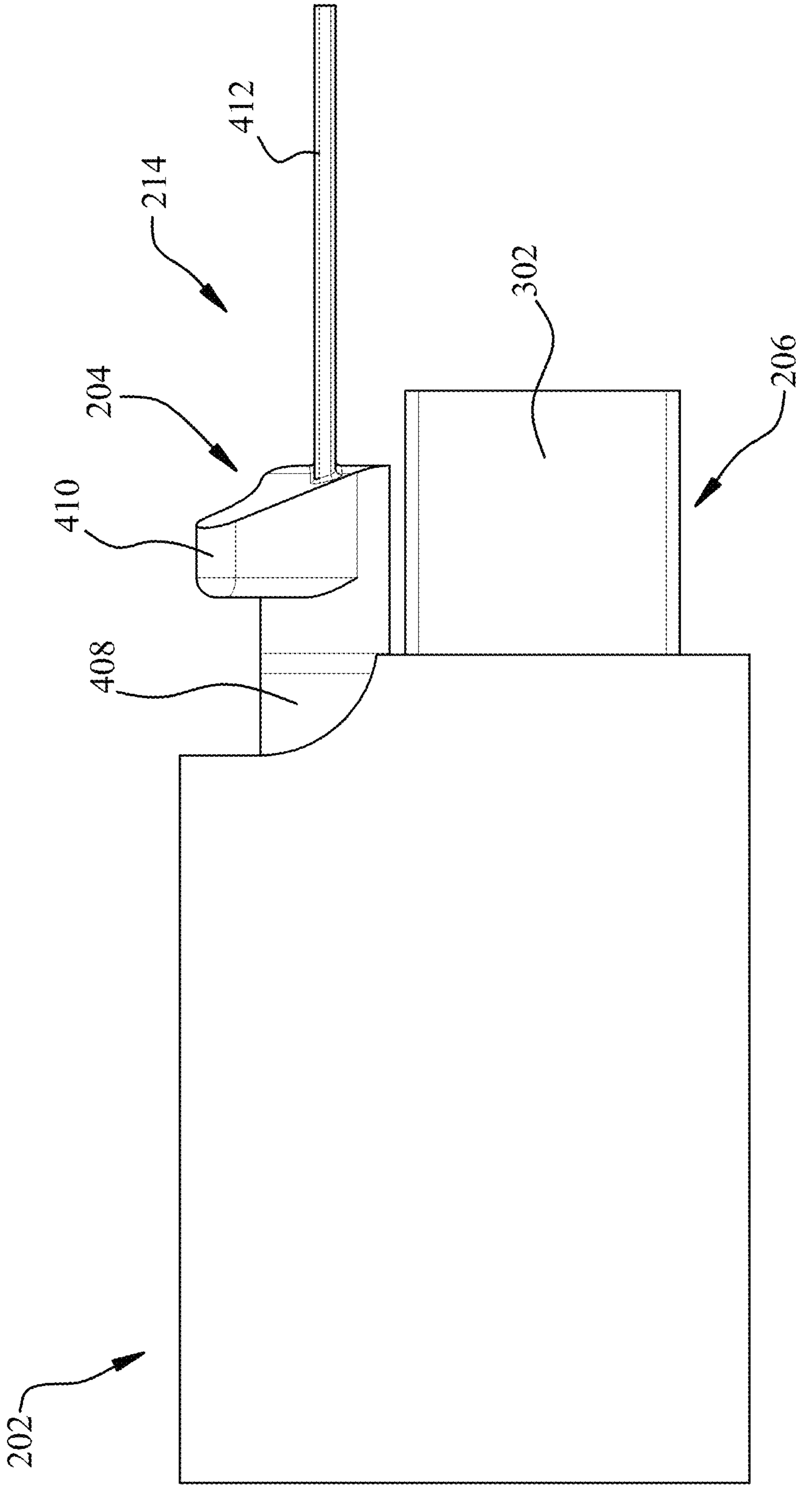
FIG. 8*a* is a side view of a torsion latch connector inserted into a jack.
Figure 8B:
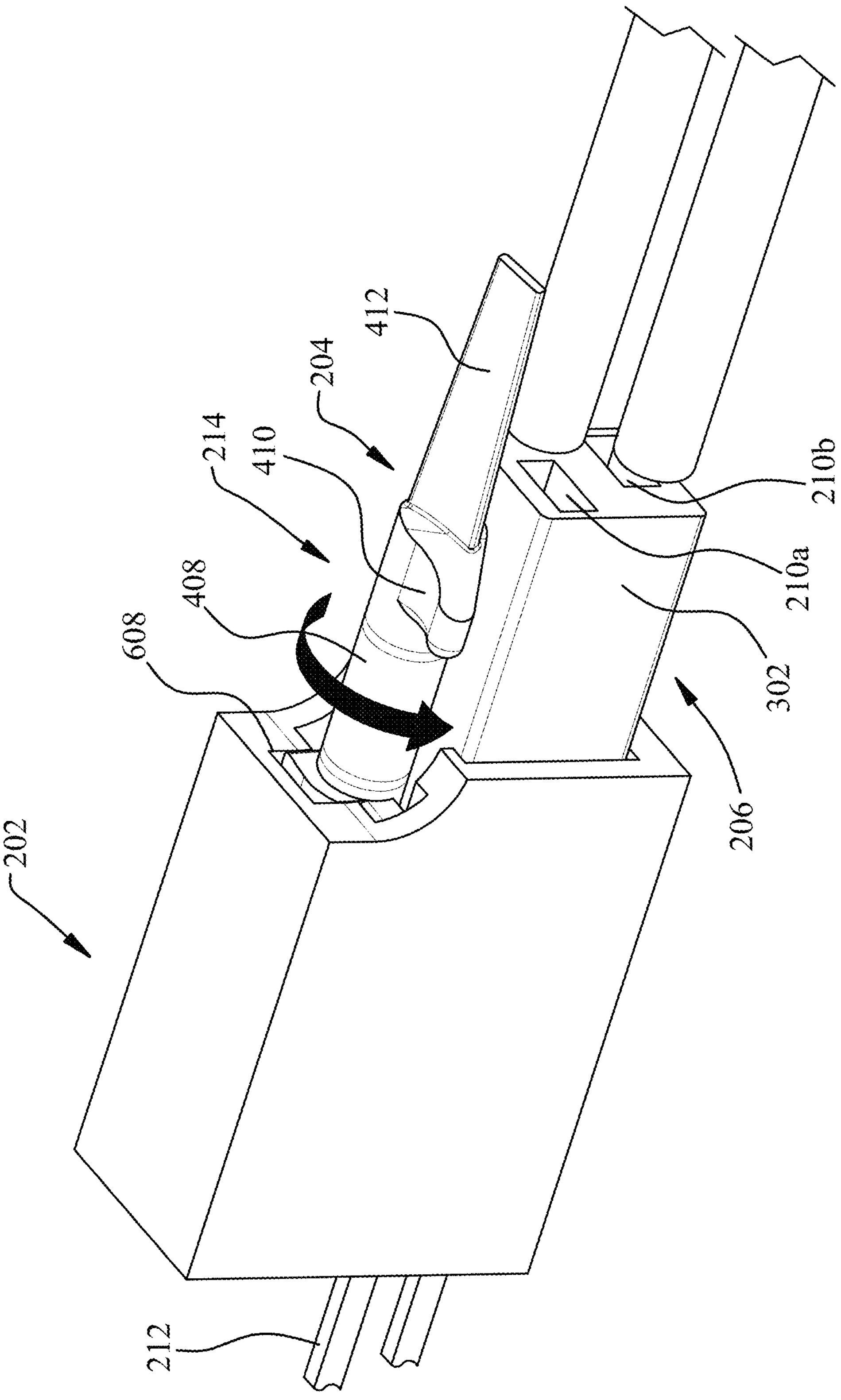
FIG. 8*b* is a perspective view of the torsion latch connector inserted into the jack.

FIGS. 7*a* and 7*b* are a side view and a perspective view, respectively, of the torsion latch connector 214 aligned for engagement with the jack 202. FIGS. 8*a* and 8*b* are a side view and a perspective view, respectively, of the torsion latch connector 214 inserted into the jack 202. As the torsion latch connector 214—comprising the assembly of the torsion latch 204 and main connector body 206—is inserted into the jack receptacle 604, the downwardly ramped bottom surface 622 of the upper left-side rail 618 (see FIG. 6*c*) applies downward pressure on the latching protrusion 414, causing the torsion latch 204 to rotate about the axis of the cone-shaped axle 304. As the torsion latch 204 rotates, the edge of the elastic spring 412 is forced against the top side 316 of the main connector body 206, creating a torsional force that opposes the downward force applied to the latching protrusion 414 by the upper left-side rail 618. When the latching protrusion 414 moves beyond the rear side 624 of the upper left-side rail 618 (see FIG. 6*c*), the countering torsion force applied by the spring 412 forces the latching protrusion 414 upward to reside behind the upper left-side rail 618. The resulting engagement between the latching protrusion 414 and the rear side 624 of the upper left-side rail 618 prevents removal of the torsion latch connector 214 from the jack 202. While the torsion latch connector 214 is inserted into the jack 202, the latch retaining block 306 and hood 404 reside in the top channel 608 of the receptacle 604.

To disengage the torsion latch connector 214, downward pressure can be applied to the release lever 410 of the torsion latch 204. Pressing the release lever 410 causes the torsion latch 204 to rotate about the cone-shaped axle 304 in a direction (represented by the arrow in FIG. 8*b*) that opposes the torsion force generated by the spring 412, moving the latching protrusion 414 to a position of disengagement from the upper left-side rail 618, allowing the torsion latch connector 214 to be removed from the jack 202.

While the torsion connector 214 is plugged into the jack 202, the positioning of the latching protrusion 414 behind the upper left-side rail 618 of the jack receptacle 604 can yield a more robust engagement relative to cantilevered latches found on many cable connectors, rendering the resulting connection more resistant to accidental disengagement due to excessive force applied to the cable. The lack of a cantilevered latch also renders the torsion latch connector 214 less susceptible to snagging while being pulled through a high-density environment, offering an improved interface for extended handles such as pullers for individual or ganged connector configurations. Moreover, the torsion latch design maintains a familiar user experience, whereby the torsion latch connector 214 is disengaged by applying a downward pressure to a lever 410 on the connector 214, an action similar to that used to disengage cantilevered latches. The disengaged connector 214 can be removed from the jack 202 easily with less resistance due to tensile or side load on the cable while removing the free connector 214 from the jack 202.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A connector, comprising:
a main connector body; and
a torsion latch rotatably connected to the main connector body,
wherein
the torsion latch comprises a latching protrusion configured to engage with an engagement mechanism in a jack receptacle,
the latching protrusion moves between an engaged position and a disengaged position via rotation of the torsion latch, and
the torsion latch further comprises a flat spring that extends from a rear end of the torsion latch and that, in response to a rotation of the torsion latch in a direction that moves the latching protrusion toward the disengaged position, generates a torsion force that acts against the rotation.

2. The connector of claim 1, wherein the latching protrusion protrudes from a main body of the torsion latch in a direction orthogonal to an axis of the main body of the torsion latch.

3. The connector of claim 1, wherein the torsion force is generated based on interaction between the flat spring and the main connector body.

4. The connector of claim 1, wherein
the torsion latch further comprises a release lever that protrudes from a main body of the torsion latch in a direction orthogonal to the axis of the main body of the torsion latch, and
application of a downward force on the release lever causes the torsion latch to rotate in the direction that moves the latching protrusion toward the disengaged position.

5. The connector of claim 1, wherein
the engagement mechanism comprises a rail formed on an inside wall of the jack receptacle,
the rail is configured to, as the connector is being inserted into the jack receptacle, apply a downward force on the latching protrusion that causes the rotation of the torsion latch in the direction that moves the latching protrusion toward the disengaged position, and
in response to the latching protrusion moving beyond an end of the rail as the connector is being inserted into the jack receptacle, the torsion force returns the latching protrusion to the engaged position.

6. The connector of claim 1, wherein
the torsion latch comprises a cylindrical main body having a hole formed through a front end of the cylindrical main body,
the hole is configured to fit over an axle formed on the main connector body, and
the torsion latch is configured to rotate about the axle.

7. The connector of claim 6, wherein
the axle is formed on a rear side of a latch retention block formed on a top of the main connector body, and
a front side of the latch retention block comprises an inclined surface.

8. The connector of claim 1, wherein a groove is formed on a side of the main connector body and is configured to receive a rail formed on an inside surface of the jack receptacle as the connecter is inserted into the jack receptacle.

9. The connector of claim 1, wherein the connector is configured to terminate conductors of a copper cable or a fiber optic cable.

10. A connector, comprising:
a latch retaining block formed on an outer surface of a main connector body; and
a torsion latch rotatably connected to the latch retaining block,
wherein
rotation of the torsion latch about the latch retaining block causes a latching protrusion formed on the torsion latch to move between an engaged position and a disengaged position, and
the latching protrusion is configured to engage with an engagement feature inside a jack receptacle while the connector is plugged into the jack receptacle.

11. The connector of claim 10, wherein the engagement feature is a rail formed on an inside wall of the jack receptacle.

12. The connector of claim 10, wherein
a flat spring extends from a rear end of the torsion latch, and
in response to a rotation of the torsion latch about the latch retaining block in a direction that moves the latching protrusion toward the disengaged position, the flat spring creates a torsion force that opposes the rotation.

13. The connector of claim 12, wherein the torsion force is created by an interaction between the flat spring and the outer surface of the main connector body.

14. The connector of claim 13, wherein a front side of the latch retaining block comprises an inclined surface.

15. The connector of claim 10, wherein
a release lever is formed on the torsion latch, and
application of a downward force on the release lever rotates the torsion latch about the latch retaining block in a direction that moves the latching protrusion toward the disengaged position.

16. The connector of claim 10, wherein the torsion latch is rotatably connected to an axle formed on a rear side of the latch retaining block.

17. A connector assembly, comprising:
a main connector body comprising a latch retaining block; and
a torsion latch configured to rotatably attach to the latch retaining block,
wherein
the latch retaining block is configured to permit rotation of the torsion latch about an axis, the torsion latch comprises a flat spring that generates a torsion force against the rotation of the torsion latch, and the rotation moves a latching protrusion formed on the torsion latch to move between an engaged position and a disengaged position.

18. The connector assembly of claim 17, wherein the latching protrusion protrudes from a main body of the torsion latch in a direction orthogonal to an axis of the main body of the torsion latch.

19. The connector assembly of claim 17, wherein the torsion force is generated based on interaction between the flat spring and the main connector body.

20. The connector assembly of claim 17, wherein the torsion latch further comprises a release lever that protrudes from a main body of the torsion latch in a direction orthogonal to the axis of the main body of the torsion latch, and application of a downward force on the release lever causes the torsion latch to rotate in the direction that moves the latching protrusion toward the disengaged position.

* * * * *